(12) United States Patent
Das et al.

(10) Patent No.: US 8,412,727 B1
(45) Date of Patent: Apr. 2, 2013

(54) GENERATING QUERY REFINEMENTS FROM USER PREFERENCE DATA

(75) Inventors: Abhinandan S. Das, Sunnyvale, CA (US); Anwis Das, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 236 days.

(21) Appl. No.: 12/794,069

(22) Filed: Jun. 4, 2010

Related U.S. Application Data

(60) Provisional application No. 61/184,504, filed on Jun. 5, 2009.

(51) Int. Cl.
*G06F 17/30* (2006.01)
(52) U.S. Cl. ....................................................... 707/767
(58) Field of Classification Search .................. 707/603, 707/706, 713, 721, 723, 735, 748, 754, 759, 707/767, 768
See application file for complete search history.

(56) References Cited

U.S. PATENT DOCUMENTS

| | | | |
|---|---|---|---|
| 6,006,222 A | 12/1999 | Culliss | |
| 6,014,665 A | 1/2000 | Culliss | |
| 6,078,916 A | 6/2000 | Culliss | |
| 6,182,068 B1 | 1/2001 | Culliss | |
| 6,539,377 B1 | 3/2003 | Culliss | |
| 6,816,850 B2 | 11/2004 | Culliss | |
| 7,725,485 B1* | 5/2010 | Sahami et al. | 707/767 |
| 7,844,599 B2* | 11/2010 | Kasperski et al. | 707/713 |
| 7,921,107 B2* | 4/2011 | Chang et al. | 707/723 |
| 7,984,004 B2* | 7/2011 | Andrew et al. | 706/45 |
| 8,065,316 B1* | 11/2011 | Baker et al. | 707/768 |
| 8,122,011 B1* | 2/2012 | Garg et al. | 707/721 |
| 2006/0026147 A1 | 2/2006 | Cone et al. | |
| 2006/0047649 A1* | 3/2006 | Liang | 707/4 |
| 2009/0119248 A1* | 5/2009 | Sundaresan et al. | 707/2 |
| 2010/0114929 A1* | 5/2010 | Bonchi et al. | 707/759 |
| 2010/0211588 A1* | 8/2010 | Jiang et al. | 707/768 |
| 2011/0238608 A1* | 9/2011 | Sathish | 706/47 |

OTHER PUBLICATIONS

U.S. Appl. No. 12/730,136, filed Mar. 23, 2010, Autocompletion Using Previously Submitted Query Data, Herscovici et al.
U.S. Appl. No. 12/871,515, filed Jun. 4, 2010, Providing Result-Based Query Suggestions, Haahr et al.
Joachims, "Evaluating Search Engines Using Clickthrough Data", Cornell University, Department of Computer Science, Draft, Feb. 19, 2002, 13 pages.
Joachims; Optimizing search engines using clickthrough data; 2002; Proceedings of the ACM SIGKDD International Conference on Knowledge Discovery and Data Mining, p. 133-142, 10 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.

* cited by examiner

*Primary Examiner* — Cam-Linh Nguyen
(74) *Attorney, Agent, or Firm* — Fish & Richardson P.C.

(57) ABSTRACT

Methods, systems, and apparatus, including computer program products, for generating query refinements from user preference data. A group of query pairs are obtained. Each query pair includes a first query and a second query. A quality score is determined for each query pair from user preference data for documents responsive to both the first and the second query. A diversity score is determined for each query pair having a quality score satisfying a quality threshold, the diversity score determined from user preference data for documents responsive to the second, but not the first, query. For each query pair having a quality score satisfying the quality threshold and a diversity score satisfying a diversity threshold, the second query of the query pair is associated with the first query of the query pair as a candidate refinement for the first query.

33 Claims, 12 Drawing Sheets

GENERATING QUERY REFINEMENTS FROM USER PREFERENCE DATA

CROSS-REFERENCE TO RELATED APPLICATIONS

This application claims the benefit under 35 U.S.C. §119(e) of U.S. Patent Application No. 61/184,504, titled "Generating Query Refinements From User Preference Data," filed Jun. 5, 2009, which is incorporated here by reference.

BACKGROUND

This specification relates to generating query refinements from user preference data.

Internet search engines provide information about Internet accessible resources (e.g., Web pages, images, text documents, multimedia content) that are responsive to a user's search query by returning a set of search results in response to the query. A search result includes, for example, a Uniform Resource Locator (URL) and a snippet of information for resources responsive to a query. However, the set of search results that are presented to a user are not always what the user is trying to find. A search engine may present query refinements (e.g., other queries related to the user's search query) to the user to help the user find desired search results.

SUMMARY

This specification describes technologies relating to generating query refinements from user preference data. In general, one aspect of the subject matter described in this specification can be embodied in a method that includes the acts of obtaining a group of query pairs, each query pair including a first query and a second query. A quality score is determined for each query pair in the group of query pairs from user preference data for documents responsive to both the first and the second query. A diversity score is determined for each query pair in the group of query pairs having a quality score satisfying a quality threshold, the diversity score determined from user preference data for documents responsive to the second, but not the first, query. For each query pair having a quality score satisfying the quality threshold and a diversity score satisfying a diversity threshold, the second query of the query pair is associated with the first query of the query pair as a candidate refinement for the first query. Other implementations include corresponding systems, apparatus, computer program products, and computer storage media.

These and other implementations can optionally include one or more of the following features. A group of candidate refinements associated with a candidate query can be selected. The group of candidate refinements can be ordered according to an order. One or more of the candidate refinements can be processed according to the order. It can be determined, for at least one additional candidate refinement in the one or more processed candidate refinements, that the additional candidate refinement has an intra-suggestion diversity score satisfying an intra-suggestion diversity threshold, the intra-suggestion diversity score estimating diversity between a first group of top documents responsive to the additional candidate refinement and a group of seen documents. The additional candidate refinement can be associated with the candidate query as a confirmed refinement. The first group of top documents can be added to the group of seen documents. The group of seen documents can include one or more top documents responsive to a highly ranked candidate refinement in the group of candidate refinements. The highly ranked candidate refinement can be associated with the candidate query as a confirmed refinement for the candidate query.

The intra-suggestion diversity score can be determined from quality of result statistics for a first plurality of documents as search results for the additional candidate refinement, wherein the first plurality of documents are not in the group of seen documents. The group of candidate refinements can be ordered based on quality scores for query pairs corresponding to the candidate query and the candidate refinements.

The quality score for each query pair can be determined from second quality of result statistics for a second plurality of documents as search results for the second query in the query pair, the second plurality of documents being responsive to the first query in the query pair and the second query in the query pair. The diversity score for each query pair can be determined from third quality of result statistics for a third plurality of documents as search results for the second query in the query pair, wherein the third plurality of documents are responsive to the second query in the query pair, but are not included in a top number of search results responsive to the first query in the query pair. The quality threshold can have a first value when the second query in a query pair is a query superstring of a first query in the query pair and a different second value when the second query is not a super string of the first query.

Associating the second query of a query pair with the first query of the query pair as a candidate refinement for the first query can include determining that the second query of the query pair contains a reference to a first geographic location, determining whether the first query contains a reference to a second geographic location, and associating the second query with the first query only if the first query contains a reference to the second geographic location. Obtaining the group of query pairs can include generating a document-to-query-to-document map from user preference data, selecting a document from the map, the map relating the document to a group of queries, and generating query pairs from the group of queries.

Particular embodiments of the subject matter described in this specification can be implemented so as to realize one or more of the following advantages. Query refinements for an initial query can be identified from user preference data. The query refinements can be selected to maintain diversity between the results for the initial query and the results for the query refinements. The query refinements can be selected to maintain diversity between the results for the selected query refinements. The query refinements can help a user quickly find relevant search results by suggesting related queries which may contain results the user is looking for, and by allowing the user to explore and obtain new information that was not present with the user's initial query. The query refinements can also help users explore a topic of interest by showing them other queries related to the topic they are searching for.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
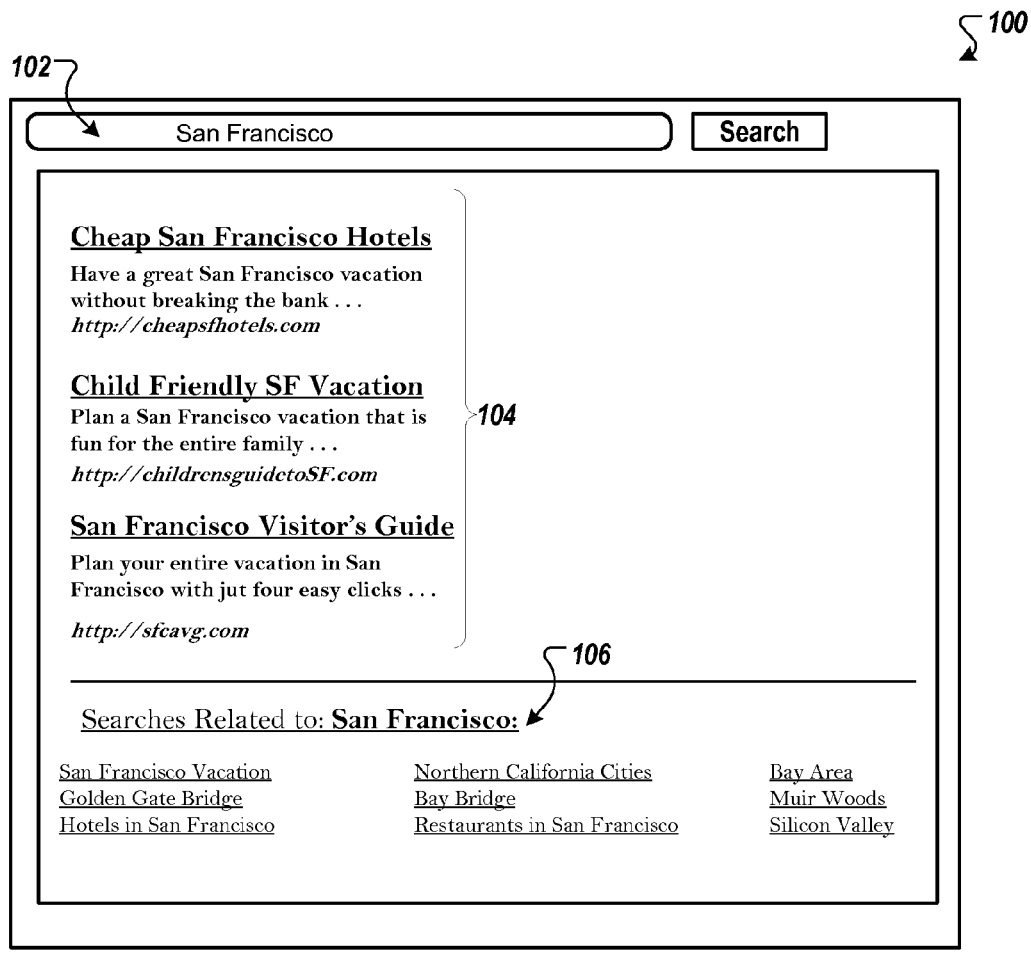
FIG. 1 illustrates an example graphical user interface that presents search results in response to a query, and also presents possible query refinements for the query.

FIG. 1 illustrates an example graphical user interface 100 that presents search results 104 in response to a query 102, and also presents possible query refinements 106 for the query 102. The query "San Francisco" 102 is submitted to a search engine through the graphical user interface 100, and a set of search results 104 that are responsive to the query 102 are generated by the search engine and presented in the user interface. While FIG. 1 show a visual display of search results, presenting search results can include various forms of presentation including, for example, transmitting search results to a user's computer for presentation to the user, transmitting search results to another device, transmitting sounds corresponding to the search results, providing haptic feedback corresponding to the search results, or transmitting signals comprising haptic feedback corresponding to the search results to a user's computer for presentation to the user. Other methods of presenting search results are possible.

Sometimes, the user's query will be a starting point for the exploration of a topic, and sometimes the user's query will be an attempt to find specific information. When users are exploring a topic, they are often looking for a general overview of the topic that may not be provided by search results alone. When the user is looking for specific information, the search results will often be what the user is looking for, and a user will click (e.g., select with a mouse or other input device, for example, a keyboard, or a tactile or an oral input device) one or more of the search results 104. However, a user will not always be satisfied with the search results 104 generated in response to a query. Users can be unsatisfied, for example, when the queries they submit are too broad. For example, when a user submits "San Francisco" but is really looking for "restaurants in San Francisco," the search engine may identify search results that are very relevant to San Francisco, but not relevant to restaurants in San Francisco. Users can also be unsatisfied, for example, when the queries they submit use non-standard or incorrect terminology. For example, a user may submit a query for "San Francisco," but really be interested in information on "Silicon Valley." Other reasons for user dissatisfaction are also possible.

To help users that were not presented with the search results they wanted (or to help users interested in exploring a topic of interest), the user interface 100 includes a group of query refinements 106, e.g., related queries that a user may find have responsive search results that are more relevant to the user's interests. A query refinement of a given query is another query that is related to the given query. Query refinements may, but need not be, superstrings of the given query. For example, the query refinements 106 for the query "San Francisco" 102 include "San Francisco Vacation" (a superstring of "San Francisco" because it includes "San Francisco" as well as the additional word "Vacation") and "Golden Gate Bridge" (not a superstring of "San Francisco" because it does not include the phrase "San Francisco"). Each query refinement 106 presented in the user interface 100 is identified by the search engine (or another system) from an analysis of user preference data (e.g., click data gathered by a search engine, as described below with reference to FIGS. 2-4) for documents satisfying both the query 102 and the query refinement. The search engine selects query refinements 106 based on the similarity of their responsive documents with the documents responsive to the query 102 as well as the differences between their responsive documents and the documents responsive to the query 102. In some implementations, the search engine further filters the candidate refinements to maintain diversity between the search results responsive to the query refinements 106.

When a user selects one of the query refinements 106, the search engine presents a new set of search results responsive to the query refinement in the user interface 100 and may optionally present a new group of query refinements for the selected query refinement.

Figure 2:
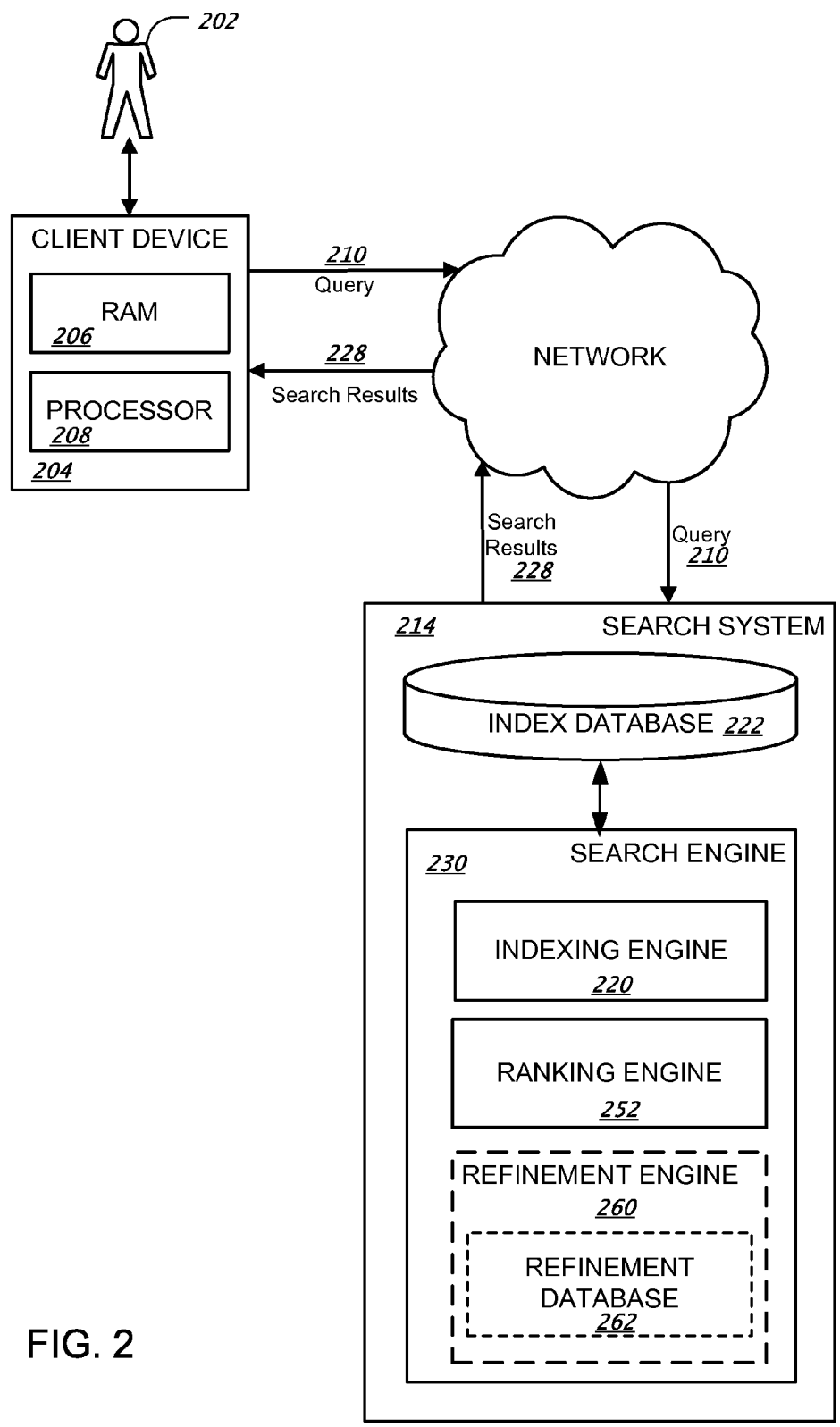
FIG. 2 illustrates an example search system for providing search results relevant to submitted queries.

FIG. 2 illustrates an example search system 214 for providing search results relevant to submitted queries as can be implemented in an internet, an intranet, or another client and server environment. The search system 214 is an example of an information retrieval system that can be used to generate the search results shown in FIG. 1, as well as to collect user preference data that the optional query refinement engine 260 can use to identify query refinements.

A user 202 interacts with the search system 214 through a client device 204. For example, the client device 204 can be a computer (e.g., a personal computer, a mobile phone, etc.) coupled to the search system 214 through a wired or wireless local area network (LAN) or wide area network (WAN), e.g., the Internet. In some implementations, the search system 214 and the client device 204 are one machine. For example, a user can install a desktop search application on the client device 204. The client device 204 will generally include a random access memory (RAM) 206 and a processor 208.

A user 202 submits a query 210 to a search engine 230 within a search system 214. When the user 202 submits a query 210, the query 210 is transmitted through a network to the search system 214. The search system 214 can be implemented as, for example, computer programs running on one or more computers in one or more locations that are coupled to each other through a network. The search system 214 includes an index database 222 and a search engine 230. The search system 214 responds to the query 210 by generating search results 228, which are transmitted through the network to the client device 204 in a form that can be presented to the user 202 (e.g., as a search results web page to be displayed in a web browser running on the client device 204).

When the query 210 is received by the search engine 230, the search engine 230 identifies documents that match the query 210. The search engine 230 will generally include an indexing engine 220 that indexes documents (e.g., web pages, images, multimedia content, or news articles on the Internet) found in a corpus (e.g., a collection or repository of content), an index database 222 that stores the index information, and a ranking engine 252 (or other software) to rank the documents that match the query 210. The indexing and ranking of the documents can be performed, for example, using conventional techniques. The search engine 230 transmits the search results 228 through the network to the client device 204 for presentation to the user 202.

In some implementations, the search system further includes a refinement engine 260 which generates query refinements from user preference data gathered by the search system 214 and stores them, for example, in a refinement database 262. The query refinement engine 260 is described in more detail below with reference to FIG. 5. The search engine can optionally retrieve refinements for the query 210 from the refinement database 262 and transmit them to the user 202 along with the search results 228.

Figure 3A:
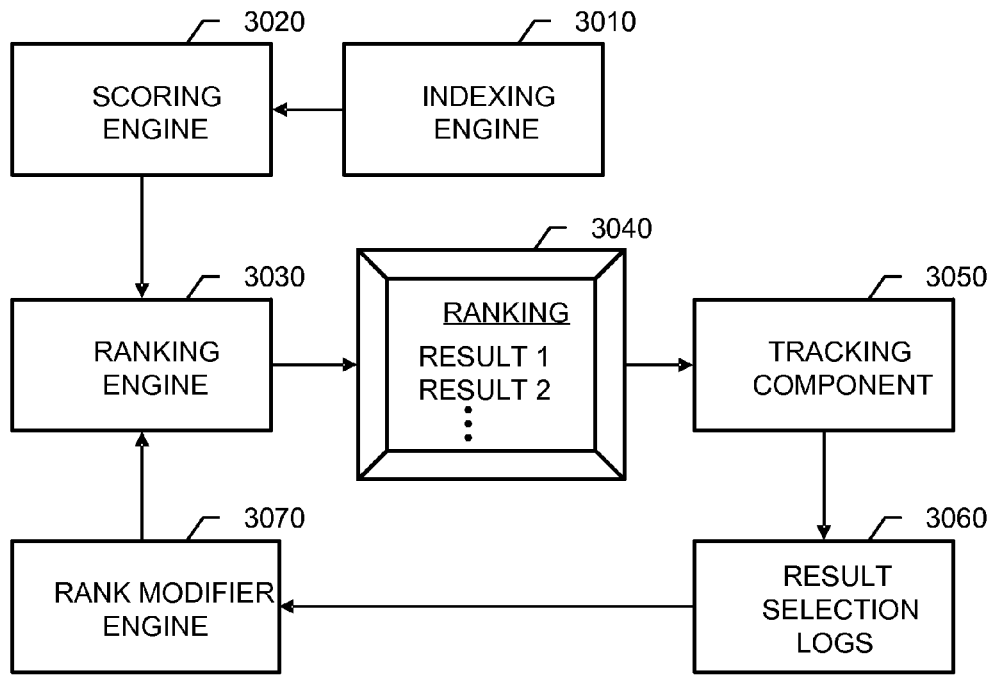
FIGS. 3A and 3B illustrate example components of example information retrieval systems.

FIG. 3A illustrates example components of an information retrieval system. These components include an indexing engine 3010, a scoring engine 3020, a ranking engine 3030, and a rank modifier engine 3070. The indexing engine 3010 functions as described above for the indexing engine 220. The scoring engine 3020 generates scores for document results based on many different features, including content-based features that link a query to document results, and query-independent features that generally indicate the quality of documents results. The content-based features include, for example, aspects of document format, such as query matches to title or anchor text in an HTML (Hyper Text Markup Language) page. The query-independent features include, for example, aspects of document cross-referencing of the document or the domain. Moreover, the particular functions used by the scoring engine 3020 can be tuned, to adjust the various feature contributions to the final IR score, using automatic or semi-automatic processes.

The ranking engine 3030 produces a ranking of document results 3040 for display to a user based on IR scores received from the scoring engine 3020 and one or more signals from the rank modifier engine 3070. A tracking component 3050 is used to record information regarding user behavior such as individual user selections of the results presented in the ranking 3040. In some implementations, the tracking component 3050 is embedded JavaScript code included in a web page ranking 3040 that identifies user selections of individual document results and also identifies when the user returns to the results page, thus indicating the amount of time the user spent viewing the selected document result. In other implementations, the tracking component 3050 is a proxy system through which user selections of the document results are routed. The tracking component can also include pre-installed software at the client (e.g., a toolbar plug-in to the client's operating system). Other implementations are also possible, for example, an implementation that uses a feature of a web browser that allows a tag/directive to be included in a page, which requests the browser to connect back to the server with message(s) regarding link(s) clicked by the user.

The recorded information is stored in result selection logs 3060. In various implementations, the recorded information includes log entries that indicate user interaction with each result document presented for each query submitted. For each user selection of a result document presented for a query, the log entries indicate the query (Q), the document (D), the user's dwell time (T) on the document, the language (L) employed by the user, and the country (C) where the user is likely located (e.g., based on the server used to access the IR system). The log entries also records negative information, such as the fact that a document result was presented to a user, but was not selected. Other information such as position(s) of click(s) (i.e., user selection(s)) in the user interface, information about the session (e.g., existence and type of previous clicks, and post-click session activity), IR scores of clicked results, IR scores of all results shown before click, the titles and snippets shown to the user before the click, the user's cookie, cookie age, IP (Internet Protocol) address, user agent of the browser, and so on, can also be recorded.

In various implementations, the time (T) between the initial click-through to the document result and the user's returning to the main page and clicking on another document result is also recorded. An assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

The components shown in FIG. 3A can be combined in various manners and implemented in various system configurations. For example, the scoring engine 3020 and the ranking engine 3030 can be merged into a single ranking engine, such as the ranking engine 252 of FIG. 2. The rank modifier engine 3070 and the ranking engine 3030 can also be merged, and in general, a ranking engine includes any software component that generates a ranking of document results after a query. Moreover, a ranking engine can be included in a client system in addition to (or rather than) in a server system.

Figure 3B:
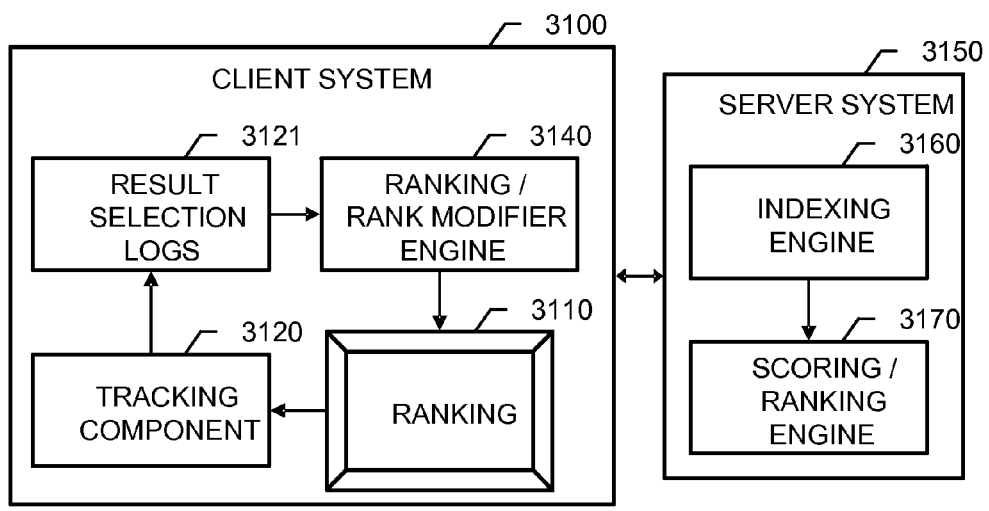

FIG. 3B shows another example information retrieval system. In this system, a server system 3150 includes an indexing engine 3160 and a scoring/ranking engine 3170. A client system 3100 includes a user interface 3110 for presenting a ranking, a tracking component 3120, result selection logs 3121 and a ranking/rank modifier engine 3140. For example, the client system 3100 can include a company's enterprise network and personal computers, in which a browser plug-in incorporates the ranking/rank modifier engine 3140. When an employee in the company initiates a search on the server system 3150, the scoring/ranking engine 3170 can return the search results along with either an initial ranking or the actual IR scores for the results. The browser plug-in then re-ranks the results locally based on tracked page selections for the company-specific user base.

Figure 4:
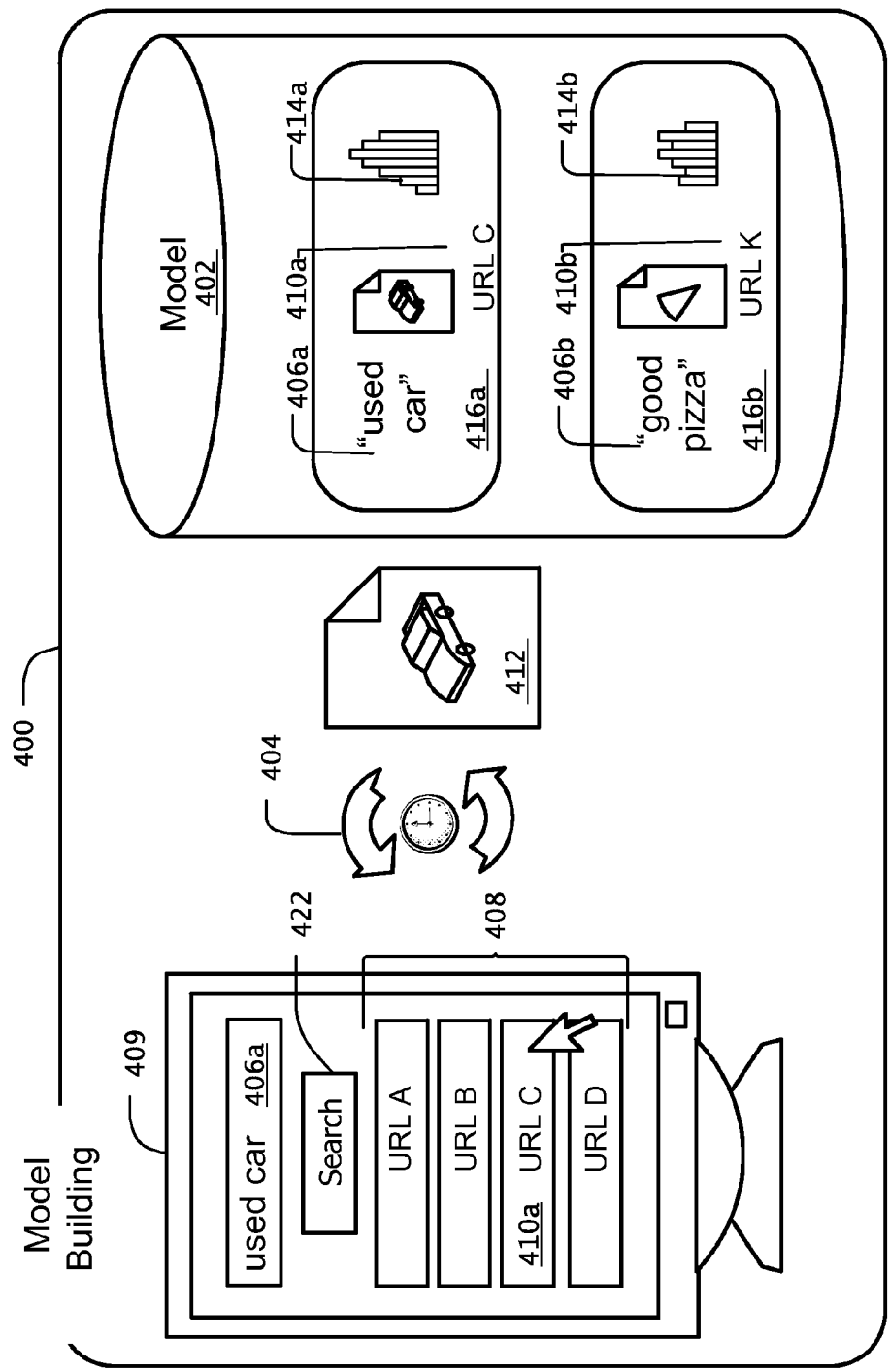
FIG. 4 is a diagram illustrating the building of an example model database for use with an information retrieval system.

FIG. 4 is a diagram illustrating the building of an example model database 402 for use with an information retrieval system. The model database 402 is one or more databases that aggregate information indicative of user behavior on at least a per-query and per-document basis, for instance. In various implementations, information in the model database 402 is used as input to a process that identifies query refinements. In some implementations, the information is also used as input to a process that ranks documents or enhances the ranking For example, the model information can be used as input to interactive or non-interactive Internet search engines, image search engines, video search engines, book search engines, consumer product search engines, other suitable processes capable of identifying query refinements or ranking documents, and combinations of these. In various implementations, a document is referenced by a universal resource locator (URL) in the model database 402; however, other types of document references are possible. For instance, a document can be a webpage on the World Wide Web referenced by a URL, or can be referenced by a globally unique user id (GUID) determined by the information retrieval system.

As shown in FIG. 4, a user submits a query 406a "used car," for example, to an information retrieval system, such as a search engine, through a graphical user interface 409, as presented on a personal computer, a mobile telephone, or other device. The user interface can be, for example, the user interface 100 shown in FIG. 1, or another user interface. A query includes one or more terms. For example, a query can include the terms "bus," "river" and "hotel." In addition to dictionary words, terms can include special characters, numbers, mathematical expressions, Boolean expressions, slang terms, names, titles, images, sounds, videos, other suitable query terms, and combinations of these. Moreover, query terms can be in more than one language.

In response to the user selecting the search button 422, for example, a search engine returns a ranking or result list 408 which is an ordered list of references to documents that are responsive to the query 406a. The result list 408 includes a set of document references URL A, URL B, URL C (401a), and URL D. The result list 408 can contain the text of the URL itself, a short description of the information found within each document, a snapshot of the portion of the document which contains the query, other suitable information, or a combination of these. If a user selects (e.g., clicks) URL C 410a from the result list 408, for example, the selected URL can cause the user interface 409 (e.g., a web browser) to present the associated document 412. Once the user has finished viewing the document, the user can navigate back to the result list 408.

In various implementations, the model database 402 is built as users interact with search engines. Each presentation of a document reference in the result list in response to a query is recorded as an "impression" of the referenced document in connection with the query. Other standards for recording impressions can also be used. For example, an impression can be recorded when a user selects the document, or a document below the document in the result list. An impression can also be recorded when a user selects the document directly above the document in the result list. In some implementations, a weighted count of impressions is calculated for each document presented in response to the query. For example, if a user selects the document or a document below the document in the result list, 1 is added to the weighted count. If a user selects a document above the document, a value of less than 1 is added to the weighted count. The value can be a constant or can be determined, for example, by dividing 1 by the number of documents between the document and the selected document in the search result list.

Each selection of the presented document reference is recorded as a "click" for the document in connection with the query. A timer can be used to track how long a user views or "dwells" on the document. For example, a longer time spent dwelling on a document (i.e., a long click) can indicate that a user found the document to be relevant for the query. A brief period viewing a document (i.e., a short click) can be interpreted as a lack of document relevance. In some implementations, the click data 414 is a count of clicks of all types (e.g., long, medium, short) for a particular query 406 and document 410 combination. In some implementations, the click data 414 includes a count of each click type (e.g., long, medium, short) for a particular query 406 and document 410 combination. Aggregated click data from queries for a given document can be used to generate a quality of result statistic for the document as a search result for the query. In general, the quality of result statistic estimates how responsive users found a given document to be as a search result for a given query. The quality of result statistic can be used to rank or enhance a ranking of that document. For example, a quality of result statistic can be an average of the weighted long clicks for a given document and query pair, a sum of the weighted clicks for a given document and query pair, or a click fraction for a given document and query pair. Various weights are also possible, for example, the clicks can be weighted by the length of the clicks, by how quickly a user clicked on a result, and whether a user clicked on a result first, second, third, etc. Various types of click fractions are possible. For example, in some implementations, the click fraction is calculated by dividing the number of clicks (or the number of weighted clicks) by the number of impressions. In other implementations, the click fraction is calculated by dividing the sum of the weighted clicks by the total number of clicks. In still other implementations, the click fraction is the sum of weighted clicks for the document presented in response to the query divided by sum of weighted clicks for all documents presented in response to the query. Other click fractions are also possible.

A search engine or other process creates a record 416 in the model database 402 for documents that are selected by users in response to a query. Each record 416 within the model 402 (herein referred to as a tuple <document, query, quality of result statistic>) is at least a combination of a query 406 submitted by users, a document reference 410 selected by users in response to that query, and an aggregation of click data 414 for all users that select the document reference 410 in response to the query 406. The aggregated click data is viewed as an indication of document relevance. In various implementations, model data is specific to a geographic location (e.g., a city, metropolitan region, state, country, or continent), specific to a language preference of users (e.g., as specified by the users in a profile or as determined from user search behavior, for example, the language of the queries issued by the user), or specific to a locale (e.g., specific to a geographic location or a set of geographic locations, and optionally a language preference). Other extensions of model data are possible.

Figure 5:
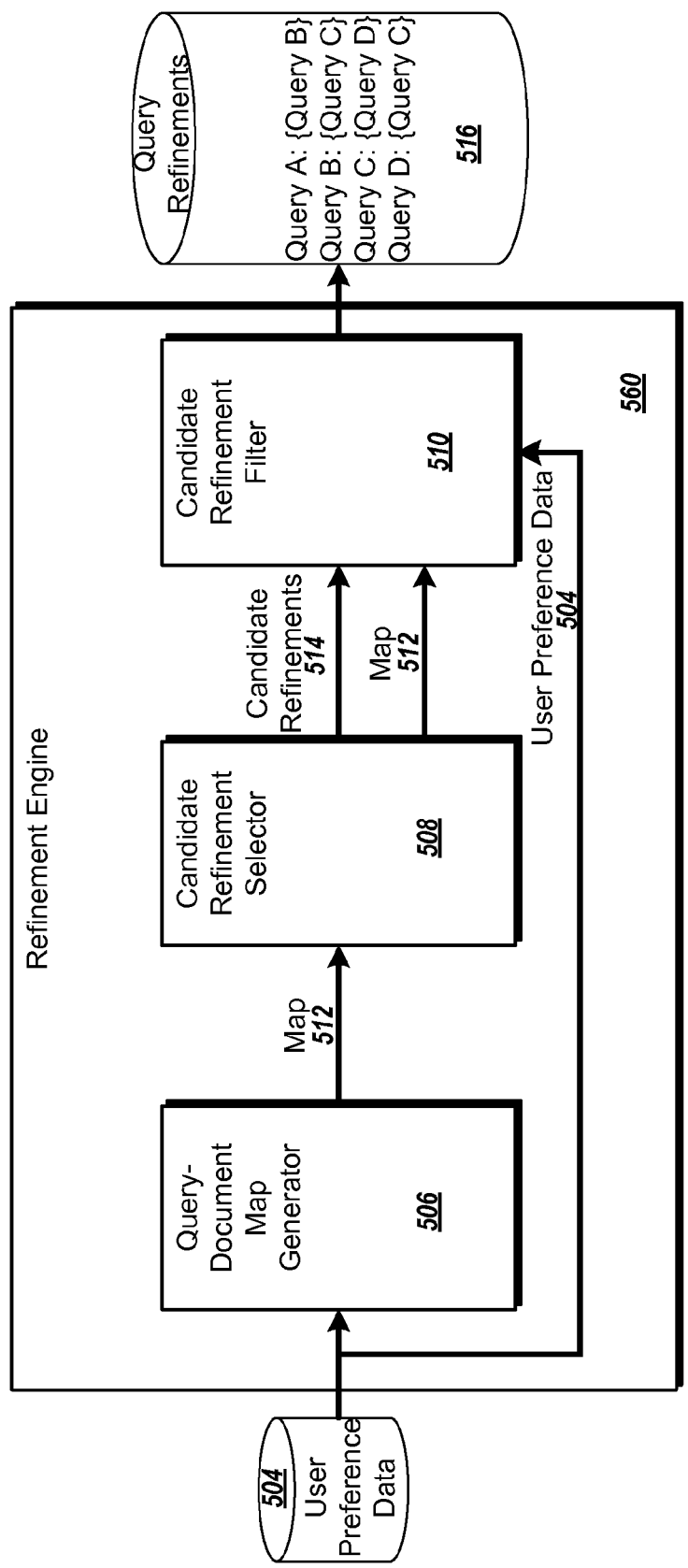
FIG. 5 illustrates an example refinement engine.

FIG. 5 illustrates an example refinement engine 260. In general, the search system analyzes user preference data 504, for example, data stored in the model database 402 of FIG. 4, and generates a group of one or more query refinements for queries in the user preference data 504. In some implementations, the refinement engine 260 is included in the search system 214 illustrated in FIG. 2. In alternative implementations, the refinement engine is separate from the search system, and merely provides refinements to the search system.

The refinement engine 260 includes a query-document map generator 506, a candidate refinement selector 508 and a candidate refinement filter 510. The boxes shown in FIG. 5 logically represent executing software components or modules. These components can be combined or subdivided in ways other than those shown in FIG. 5 and can be distributed on two or more computing devices.

The query-document map generator 506 receives the user preference data 504 and generates a document-to-query-to-document map 512 from the user preference data. In general, the document-to-query-to-document map models relationships between the documents and the queries (and the queries and the documents) that are derived from the user preference data 504. The document-to-query-to-document map is described in more detail below, with reference to FIG. 6.

The candidate refinement selector 508 receives the map 512 and generates a set of candidate refinements 514 for queries in the map 512. The candidate refinement selector 508 is described in more detail below with reference to FIG. 7.

The candidate refinement filter 510 receives the map 512 and the candidate refinements 514 and filters the candidate refinements 514 based on data stored in the map 512, resulting in a final set of query refinements 516 including one or more query refinements for some of the queries in the map. The candidate refinement filter 510 is described in more detail below with reference to FIG. 10.

Figure 6:
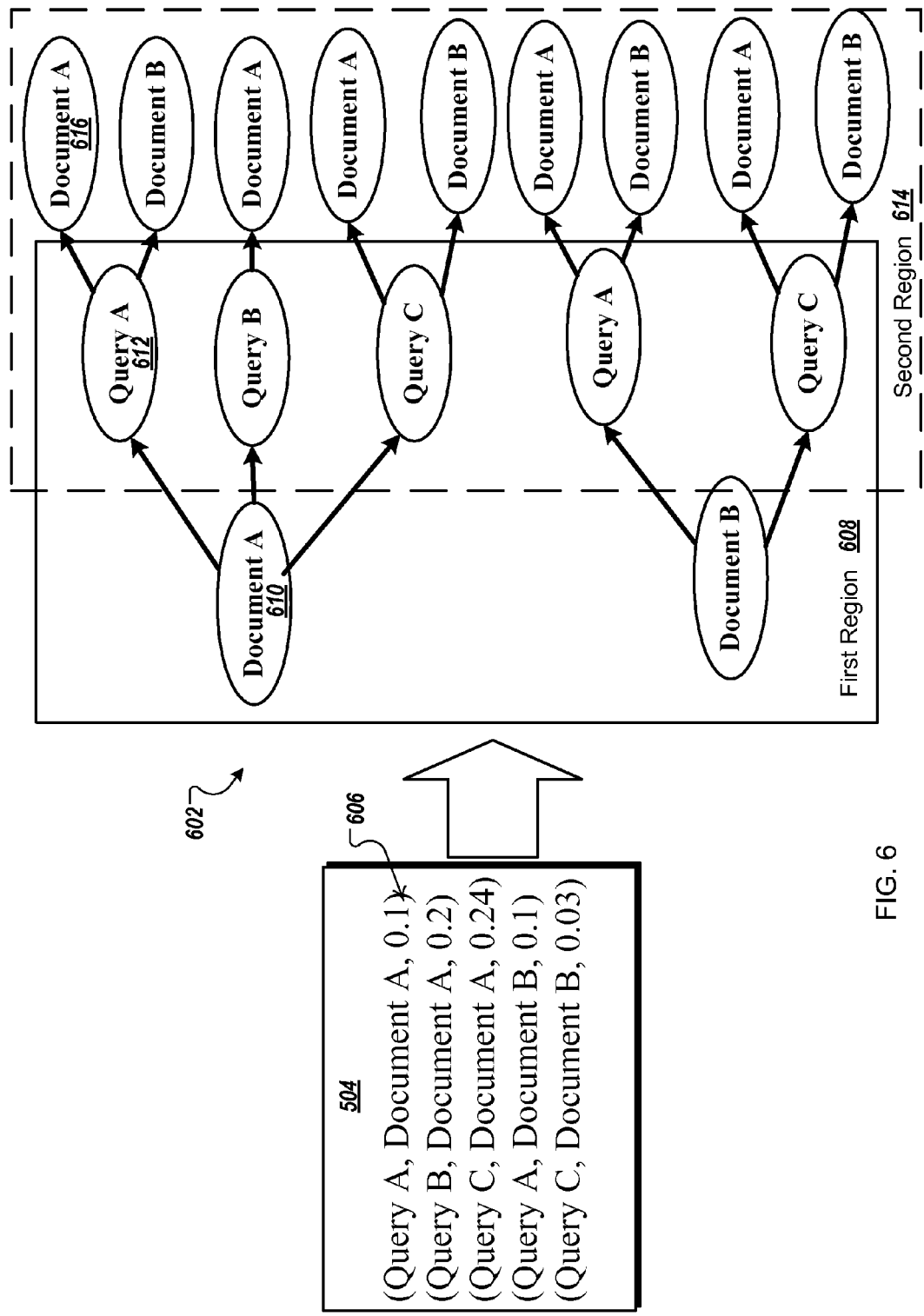
FIG. 6 illustrates an example map generated from user preference data.

FIG. 6 illustrates an example map 602 generated from user preference data 504. The user preference data 504 includes tuples associating a query, a document, and a quality of result score for the document (e.g., tuple (Query A, Document A, 0.1) 606). The query-document map generator 506 processes the tuples 504 to generate a map such as the map 602. The map identifies which queries are related to which documents, and which documents are related to which queries. In general, a document is related to a query (and a query is related to a document) when there is a tuple associating the query and the document in the user preference data 504. However, in some implementations, the map generator 506, will require an additional threshold requirement to be met before a query is related to a document (or a document is related to a query). While FIG. 6 illustrates the map as a graph where nodes correspond to documents and queries and edges correspond to relationships between documents and queries, other types of maps are possible. For example, in some implementations, the map stored as a database. Also, while the map is a convenient way of storing the relationships, the relationships identified in the map can alternatively be generated as needed from the user preference data 504 without creating the map.

The map 602 illustrated in FIG. 6 has two overlapping regions. The first region 608 corresponds to relationships between documents and queries that are identified from the user preference data 504. For example, entry 606 in the user preference data is a tuple associating query A with document A. Therefore, the first region 608 includes an arrow (indicating a relationship) from a node 610 representing document A to a node 612 representing query A. In some implementations, the query-document map generator 506 relates each document in the first region to all queries for which there is a tuple in the search history data corresponding to the document and the query. In other implementations, the query-to-document map generator 506 further requires that a query satisfy a given threshold before a document is associated with the query. For example, in some implementations, the query-to-document map generator 506 further requires that a query have a quality of result statistics for a given document and a given query that satisfies a threshold (e.g., a click fraction that exceeds 0.05, or a weighted clicks score that exceeds 50), before the document is related to the query. In other implementations, the query-to-document map generator 506 further requires that a query have a sum of quality of result statistic across all documents in the user preference data that satisfies a threshold in order for a document in the first region 608 to be related to the query. The thresholds can be determined empirically, for example, to balance between number of candidate query refinements and quality of query candidate refinements. Other requirements are also possible.

The second region 614 in the map corresponds to relationships between queries and documents that are identified from the user preference data. For example, the second region 614 includes an arrow (indicating a relationship) from the node 612 representing query A to a node 616 representing document A, because there is a tuple 606 in the user preference data 504 that associates query A and document A. In some implementations, the query-to-document map generator 506 relates each query in the second region to all documents for which there is a tuple in the search history data corresponding to the query and the document. In other implementations, the query-to-document map generator 506 further requires that a document satisfy a given threshold before a query is related to the document. For example, in some implementations, the query-document map generator 506 further requires that a document have a quality of result statistic for a given query (as opposed to all queries) that satisfies a threshold (e.g., a click fractions that exceeds 0.05, a weighted clicks score that exceeds 50) before the query is related to the document. In other implementations, the query-document map generator 506 further requires that a document have a sum of quality of result statistics across all queries in the user preference data that satisfies a threshold (e.g., a sum of click fractions that exceeds 0.05, or a sum of weighted clicks that exceeds 50). The threshold can be determined empirically, for example, to balance between number of candidate query refinements and quality of query candidate refinements, and may, but need not be, the same as the threshold for the first region 608. Other requirements are also possible.

In some implementations, the query-to-document map generator 506 further filters queries, for example, to remove queries with text included in a list of phrases (e.g., words and symbols) that should be filtered out, for example text used in URLs or advanced operators that have special meaning to the search engine from the map. For example, the query-to-document map generator 506 can remove one or more of "www," ".com," ".net," and ":" (where a colon has a special meaning that causes a search engine to search only within the URL that follows the colon). Other phrases can also be filtered, for example, pornographic, offensive, and hate speech phrases.

Figure 7:
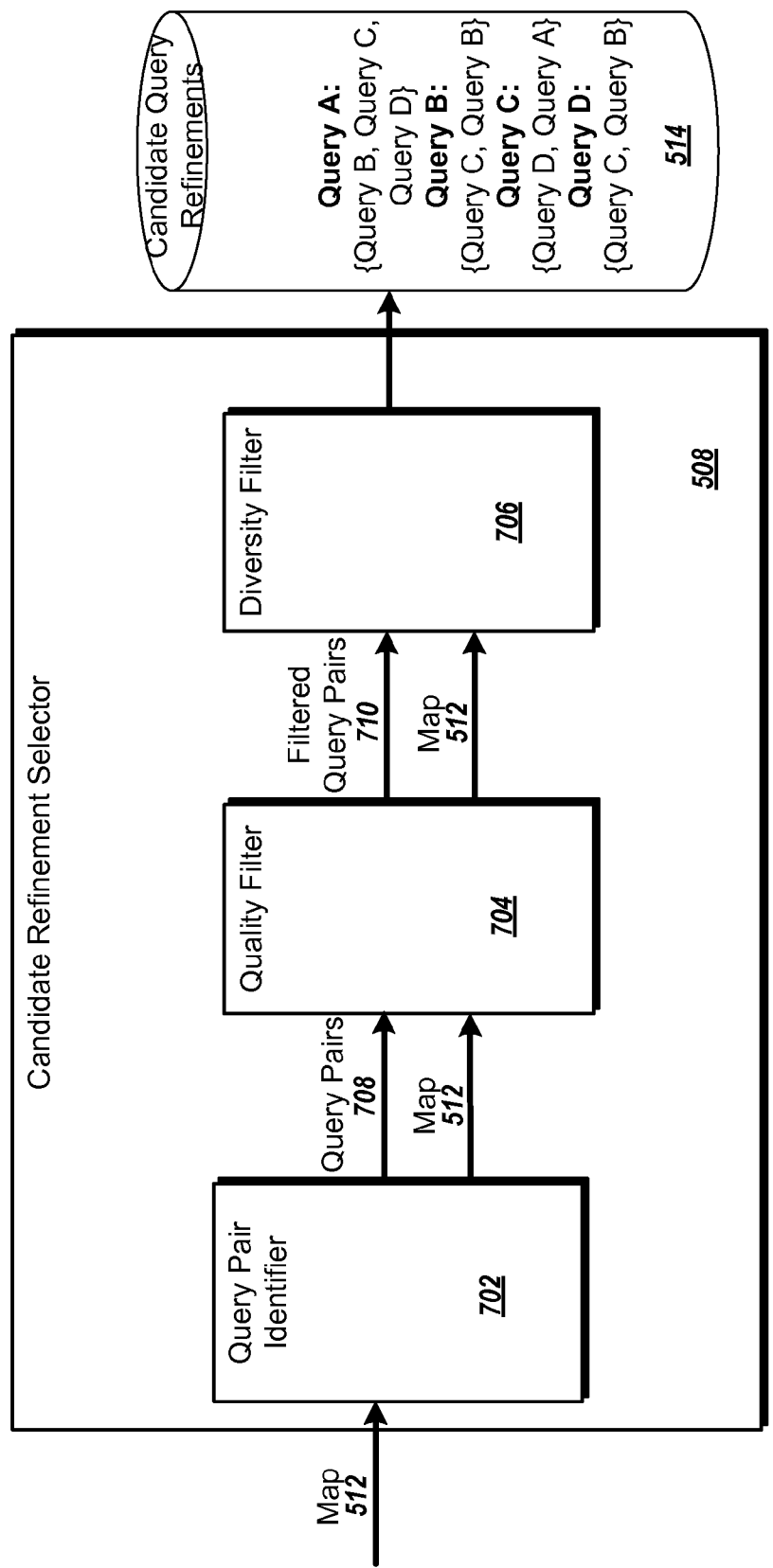
FIG. 7 illustrates an example candidate refinement selector.

FIG. 7 illustrates an example candidate refinement selector 508. The candidate refinement selector 508 includes a query pair identifier 702, a quality filter 704, and a diversity filter 706. The boxes shown in FIG. 7 logically represent executing software components or modules. These components can be combined or subdivided in ways other than those shown in FIG. 7 and can be distributed on two or more computing devices.

The query pair identifier 702 receives the map 512 and generates a group of query pairs 708 from the map. Each query pair has a first query and a second query. The candidate refinement selector 508 then processes each of the identified query pairs to determine if the second query is a candidate query refinement for the first query.

The query pair identifier 702 identifies the query pairs as follows. First, the query pair identifier 702 selects a group of queries that a given document is related to. For example, in the first region 608 of the map 602 illustrated in FIG. 6, document A is related to query A, query B, and query C. Therefore, the query pair identifier 702 would select queries A, B, and C as related to document A. The query pair identifier 702 then generates the query pairs from queries to which a document is related. For example, the query pair identifier 702 can generate query pairs: (query A, query B), (query A, query C), (query B, query A), (query B, query C), (query C, query A), and (query C, query B) from queries A, B, and C. In some implementations, the query pair identifier 702 generates query pairs for all possible combinations of the queries to which the document is related. In alternative implementations, the query pair identifier 702 generates query pairs from a subset of the possible combinations, for example, by considering combinations where one or both queries have a quality of result statistic for the document that exceeds a threshold. Other implementations are also possible. For example, in some implementations, the query pair identifier 702 only generates query pairs from queries having at least one word in common. In other implementations, the query pair identifier 702 only generates query pairs from queries where the second query is a superstring of the first query. In some implementations, the query pair identifier 702 does not use the map 512 to identify the group of queries to which a document is related, but instead uses the user preference data itself to identify relationships between documents and queries.

The quality filter 704 receives the query pairs 708 and the map 512, calculates a quality score for each query pair, and then filters the query pairs based on their quality scores. In some implementations, the quality of result statistics are included in the map 512, and in some implementations, they are provided to the quality filter 704 instead of, or in addition to, the map 512. Each quality score is determined from user preference data (e.g., quality of result statistics) for documents responsive to both the first and the second query in the query pair. In general, the quality filter 704 calculates the quality score from quality of result statistics for documents responsive to the first query, as search results for the second query. The quality score generally reflects whether the first query and the second query share documents frequently selected by users.

In some implementations, the quality filter 704 performs the following operations. First, the quality filter 704 identifies documents responsive to the first query in the query pair. In some implementations, the quality filter 704 identifies documents responsive to the first query in the query pair from relationships in the document map (e.g., from the relationships in the second region 614 of the map 602 shown in FIG. 6). For example, in the second region 614 of the map 602, the nodes 616 and 618 for documents A and B are related to query A. Therefore, these documents are responsive to query A. In other implementations, the quality filter 704 identifies documents that are related to the first query and that have a quality of result statistic satisfying a threshold (e.g., 0.1). The threshold can be determined, for example, empirically to balance between having the threshold set too low (where insignificant documents that may not really be relevant to the query are included) and having the threshold set too high (where relevant documents will be excluded). Other methods for determining documents responsive to the first query are also possible. For example, in some implementations, the quality filter 704 identifies the documents directly from user preference data (e.g., by selecting the documents with a tuple corresponding to the query, or with a quality of result statistic for the query that satisfies a threshold). As another example, in other implementations, the quality filter 704 identifies a top number of documents identified as responsive to the first query by a search system, such as the search system 214 described above with reference to FIG. 2.

Second, the quality filter 704 determines quality of result statistics for those documents as search results for the second document in the query pair. In some implementations, the quality filter 704 determines quality of result statistics for the identified documents as search results for the second document in the query pair from the map 512, for example, the map 602 illustrated in FIG. 6. For example, the quality filter 704 can determine which of the identified documents are related to the second query from the relationships shown in the second region 614 of the map, and then retrieve the quality of result statistic for those documents as search results for the second query, either from the map itself, or from the user preference data. Other implementations are also possible.

Third, the quality filter 704 combines the quality of result statistics to generate the quality score (e.g., by summing the quality of result statistics). In some implementations, the quality filter 704 combines the quality of result statistics to generate the quality score by summing the quality of result statistics. However, other combinations are possible. For example, in some implementations, the quality filter 704 averages the quality of result scores.

Finally, the quality filter determines whether the query pair should be included in a group of filtered query pairs 710 provided to the diversity filter 706, or excluded from the group of filtered query pairs 710 (e.g., based on the quality score). In some implementations, the quality filter determines whether the query pair should be included in a group of filtered query pairs 710 provided to the diversity filter 706, or excluded from the group of filtered query pairs 710 by determining whether the quality score for the query pair satisfies a threshold (e.g., exceeds a threshold, when the threshold is a minimum value for the quality score, or is below a threshold, when the threshold is a maximum value for the quality score). The threshold can be determined, for example, empirically, to balance the tradeoff between the number of candidate query refinements and the quality of the candidate query refinements. In some implementations, the threshold is lower (e.g., 0) when the second query is a superstring of the first query. In some implementations, the quality filter automatically includes a query pair in the group of filtered query pairs 710 when the second query is a superstring of the first query.

The diversity filter 706 receives the filtered query pairs 710 and the map 512 and determines whether the search results responsive to the second query in the pair are diverse enough from the search results responsive to the first query in the pair for there to be value in using the second query as a query refinement for the first query. If there is little diversity between the search results responsive to the two queries, then the second query is not a good query refinement because it will not help users find search results that they could not have found with the first query.

The diversity filter 706 calculates a diversity score for the query pair from user preference data (e.g., quality of results statistics, or other data) for documents that are responsive to the second, but not the first, query. The diversity score thus measures how good the different search results that would be seen in response to the second query are.

The diversity filter 706 generates the group of documents that are responsive to the second, but not the first, query by identifying a top group of documents responsive to the first query and a top group of documents responsive to the second query, and then generating a group of documents that contains documents from the top group of documents responsive to the second query that are not in the top group of documents responsive to the first query. The top group of documents for each query includes, for example, a fixed number of the top documents (when the documents are ordered, for example, based on quality of result statistics for the document and the query), or all documents whose quality of result score for the query satisfies a threshold. The thresholds can be determined empirically, for example, to balance between having the threshold set too low (where insignificant documents that may not really be relevant to the query are included) and having the threshold set too high (where relevant documents will be excluded). The threshold or fixed number of documents may, but need not, be the same for the first and the second query. Alternatively, the top group of documents for one or both queries can be documents whose quality of result statistic for the query satisfies a threshold (e.g., 0.025 or 0.05). Other methods of generating the group of documents that are responsive to the second, but not the first, query are also possible. For example, in some implementations, the diversity filter 706 takes the difference of the set of all documents responsive to the second query and the set of all documents responsive to the first query.

Once the group of documents responsive to the second, but not the first, query are identified, the diversity filter 706 calculates the diversity score from user preference data for the documents as search results for the second query, for example, by summing or averaging the diversity scores. The diversity filter 706 then filters the query pairs based on the diversity scores, so that query pairs whose diversity scores satisfy a diversity threshold are output as the set of candidate query refinements 514. The set of candidate query refinements 514 associates one or more candidate query refinements with queries from the map. Each query is a first query in a query pair, and each candidate refinement is a second query in a query pair. The diversity threshold can be determined empirically, for example, to balance the tradeoff between the number of candidate query refinements and the quality of the candidate query refinements. For example, when possible diversity thresholds range from 0 to 1, a middle value, such as 0.4 or 0.5 can be chosen. In some implementations, for example, when the quality score and the diversity score are both sums of the quality of result statistics, the quality threshold and the diversity threshold are chosen with reference to the other (e.g., when the quality threshold is higher, the diversity threshold is lower, and vice versa).

In some implementations, candidate refinement selector 508 generates candidate refinements for queries that are specific to a given locale (e.g., specific to a geographic location or a set of geographic locations, and optionally a language preference). For example, the user preference data 504 or the map 602 can only include data specific to a given locale, or the candidate refinement selector 508 can filter the data it uses to generate the query refinements.

Figure 8A:
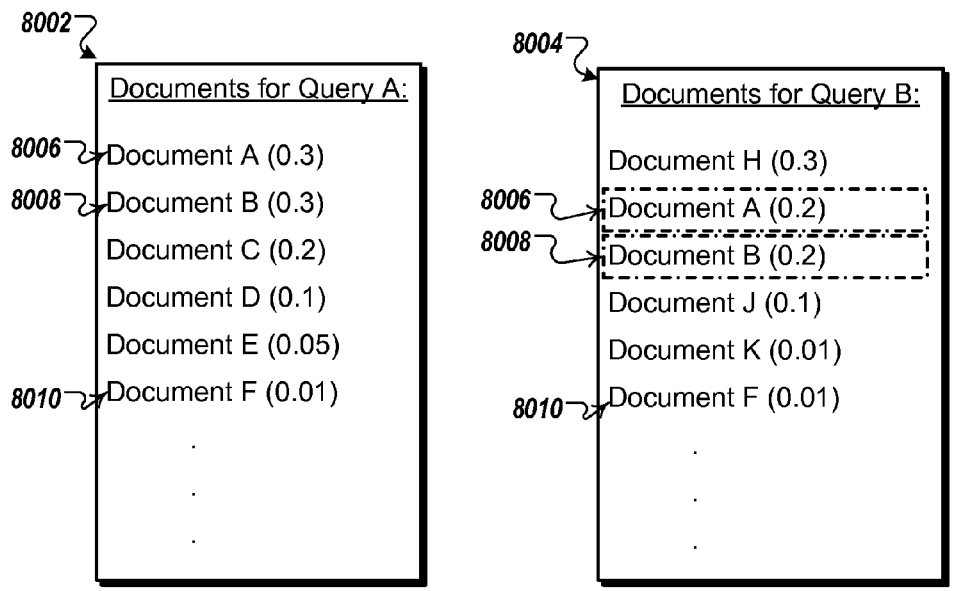
FIG. 8A illustrates an example of identifying documents responsive to both the first and the second query in a query pair.

FIG. 8A illustrates an example of identifying documents responsive to both the first and the second query in a query pair. FIG. 8A includes a group of documents 8002 responsive to query A (along with the quality of result statistics for the document as a search result for query A) and a group of documents 8004 responsive to query B (along with the quality of result statistics for the document as a search result for query B). The two groups of documents have three documents in common: document A 8006, document B 8008, and document F 8010. Although the two queries share three documents, in some implementations, the quality filter 704 will use a subset of the shared documents (e.g., document A 8006 and document B 8008) to calculate a quality score for a query pair of (query A, query B), because the quality of result statistics for the other shared documents as a search result for query A (e.g., document F 8010 having a quality of result statistic of 0.01 for query A) do not satisfy the threshold used by the quality filter.

Figure 8B:
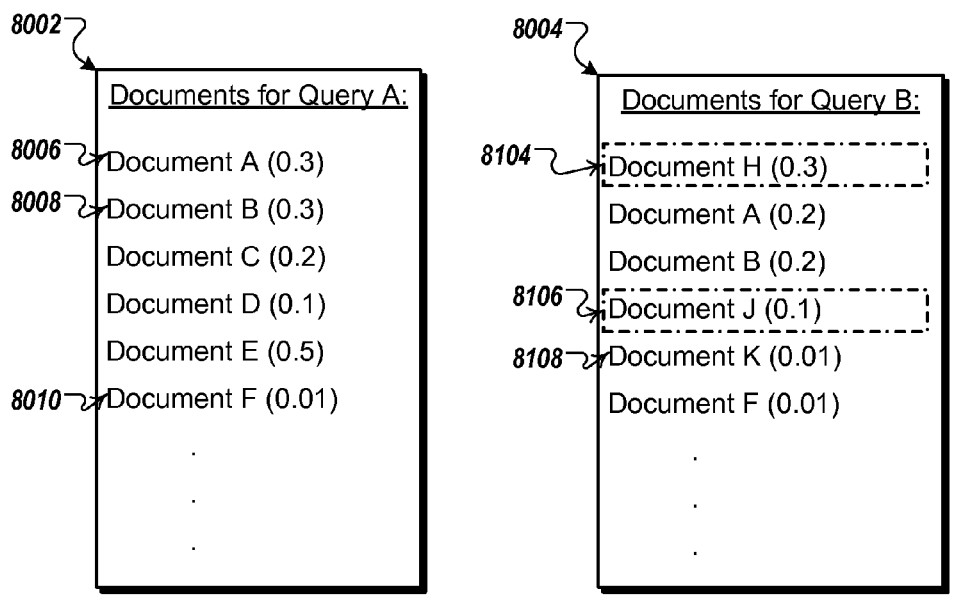
FIG. 8B illustrates an example of identifying documents responsive to the second, but not the first, query in a query pair.

FIG. 8B illustrates an example of identifying documents responsive to the second, but not the first, query in a query pair. FIG. 8B includes the same group of documents 8002 responsive to query A, as well as the same group of documents 8004 responsive to query B. The documents 8004 responsive to query B include three documents that are not in the documents 8002 responsive to query A: document H 8104, document J 8106, and document K 8108. Although the documents 8004 responsive to query B include three documents not in the group of documents 8002 responsive to query A, in some implementations, the diversity filter 706 will use a subset of the unique documents (e.g., document H 8104 and document J 8106) to calculate a diversity score for the query pair (query A, query B), because the quality of result statistics for the other unique documents as a search result for query B (e.g., document K 8108, having a quality of result statistic of 0.01 for query B) do not satisfy the threshold used by the diversity filter.

Figure 9:
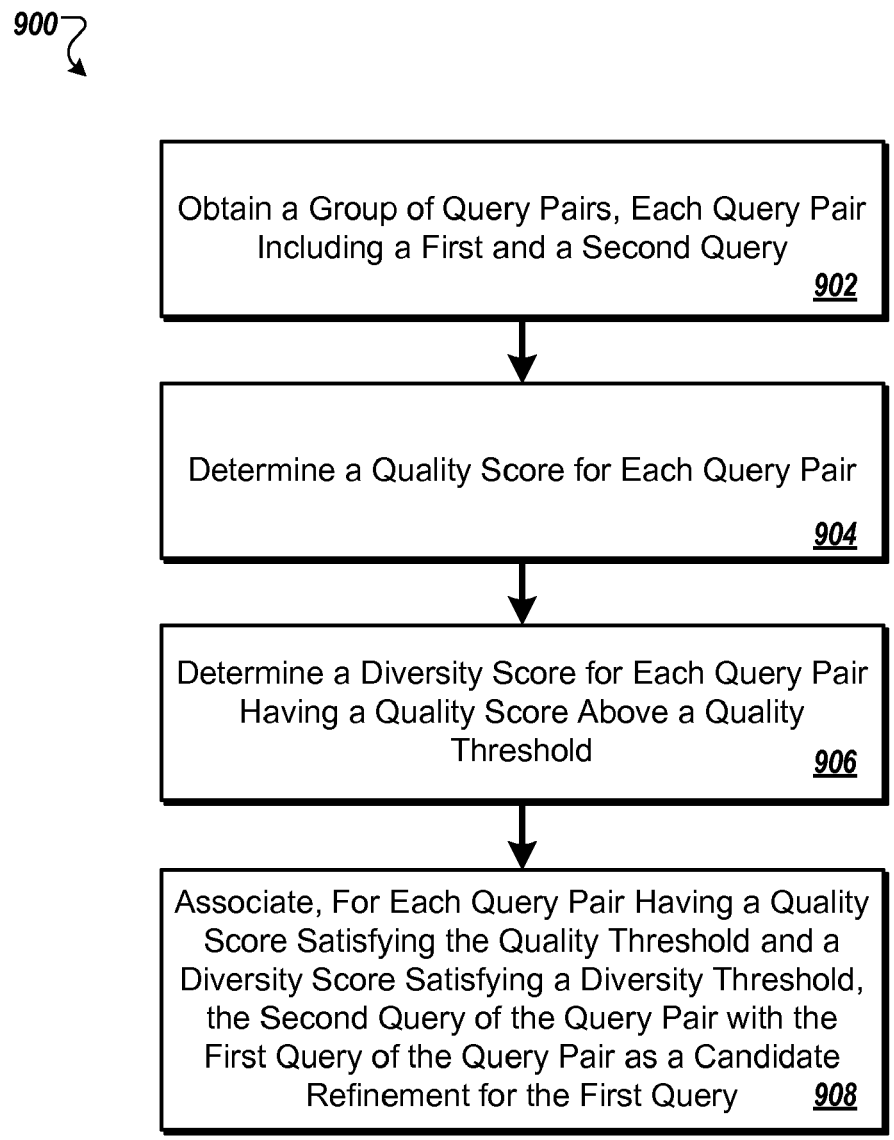
FIG. 9 illustrates an example method for selecting query refinements from query pairs.

FIG. 9 illustrates an example method 900 for selecting query refinements from query pairs. For convenience, the example method 900 will be described in reference to a system that performs the method 900. The system can be, for example, the candidate refinement selector 508.

The system obtains a group of query pairs (step 902). Each query pair includes a first query and a second query. The system obtains the query pairs, for example, as described above with reference to FIG. 7.

The system determines a quality score for each query pair (step 904), for example, as described above with reference to FIG. 7.

The system then determines a diversity score for each query pair having a quality score above a quality threshold (step 906), for example, as described above with reference to FIG. 7.

In some implementations, the system determines a diversity score for each query pair having a quality score above the quality threshold and a minimum number of documents included in the top documents for both the first and the second query. The minimum number can be determined, for example, empirically.

In some implementations, the system uses a lower quality threshold for query pairs where the second query is a superstring of the first query than for query pairs where the second query is not a superstring of the first query. In some implementations, the threshold is 0. When the threshold is 0, the system can optionally skip calculating the quality score and treat the query pair as if the quality score satisfies the threshold.

The system associates, for each query pair having a quality score satisfying the quality threshold an a diversity score satisfying a diversity threshold, the second query of the query pair with the first query of the query pair as a candidate refinement for the first query (step 1008), for example, as described above with reference to FIG. 7.

In some implementations, the system performs additional filtering before associating the second query with the first query as a candidate refinement (or after associating the second query with the first query as a candidate refinement, to reduce the number of candidate refinements associated with the first query). For example, in some implementations, the system does not store candidate refinements for a group of the most popular queries, because these queries are mostly navigational in nature (i.e., a user is searching for the name of a popular website to go to that website, rather than seeking information about the website). The system can identify whether a given query is one of the most popular queries, for example, from user preference data, from information received from a search engine, or from a blacklist that it maintains.

As another example, in some implementations, the system filters out candidate refinements that are a substring of the original query for which they are a refinement.

As another example, in some implementations, the system filters out any candidate refinements that include phrases (e.g., one or more words or symbols) on a list of phrases to filter. For example, the system can filter queries that are pornographic (e.g., contain pornographic text or will lead to pornographic results), that contain offensive or racist or hate speech, or that contain text associated with URLs or advanced search engine operators (e.g., "www," ".com," ".net," or ":"). For example, in some implementations, the system maintains a list of known pornographic queries or phrases (or offensive or racist or hate speech queries or phrases, or known URL text and advanced search engine operations), compares each candidate refinement to the list, and removes candidate refinements that include text on the list. In some implementations, the list is pre-defined. In alternative implementations, the list is generated using a machine learning engine that processes lists of known phrases to identify other phrases that should be filtered out.

As another example, in some implementations, the system filters out candidate refinements that include a geographic location when the query that they are a refinement for does not include a geographic location. For example, if the query is "department store" and a candidate refinement is "department store near San Francisco," the system would filter out the candidate refinement, because "San Francisco" is a geographic location, and the query "department store" does not include a geographic location. This filtering is useful when a concept is popular in many locations (for example, when the original query is for a restaurant chain). In these situations, it is unlikely that the particular geographic location included in the query refinement will match the user's geographic location, and the user is likely to be frustrated if they are presented with completely irrelevant refinements. In some further implementations, the system does not filter out the candidate search result, but instead, flags it. At a later time when a user submits the query, the user's geographic location is estimated (for example, using an Internet Protocol (IP) address of the computer from where the query is submitted, and the search system determines whether that location is close enough in the query refinement (e.g., within 100 miles). If the locations are close enough, the refinement is presented to the user. If the locations are not close enough, the refinement is not presented to the user.

As another example, in some implementations, the system normalizes the candidate refinements for a given query (for example, by applying a stemming algorithm to reduce the terms of the refinements to their base form or by removing stop words, e.g., known terms that do not contribute to the topicality of the query such as "a" or "the," or "of"). The system then filters the refinements to remove syntactic duplicates (e.g., so that only one refinement of the refinements that normalize to the same query is associated with each query. For example, when the system determines that multiple refinements normalize to the same query, the system can associate the refinement from the query pair having the best quality score with the query.

As yet another example, in some implementations, the system filters out candidate refinements that have a measure of usefulness that does not satisfy a threshold. For example, the system can filter out refinements whose click through rate does not satisfy a threshold, or can filter out click through rates whose overall number of weighted clicks across all documents presented in response to a query for the refinement divided by the overall number of weighted impressions across all documents presented in response to a query for the refinement satisfies a threshold. The threshold can be determined empirically to balance between quality of candidate refinements and number of candidate refinements. For example, in some implementations, the threshold is 0.34.

In some implementations, the system also checks the spelling of the candidate refinements, for example, by processing the refinements with a batch spell checker, and corrects the spelling in any misspelled refinements. In these implementations, the system can use either the user preference data for the correctly spelled refinement, or the misspelled refinement.

Figure 10:
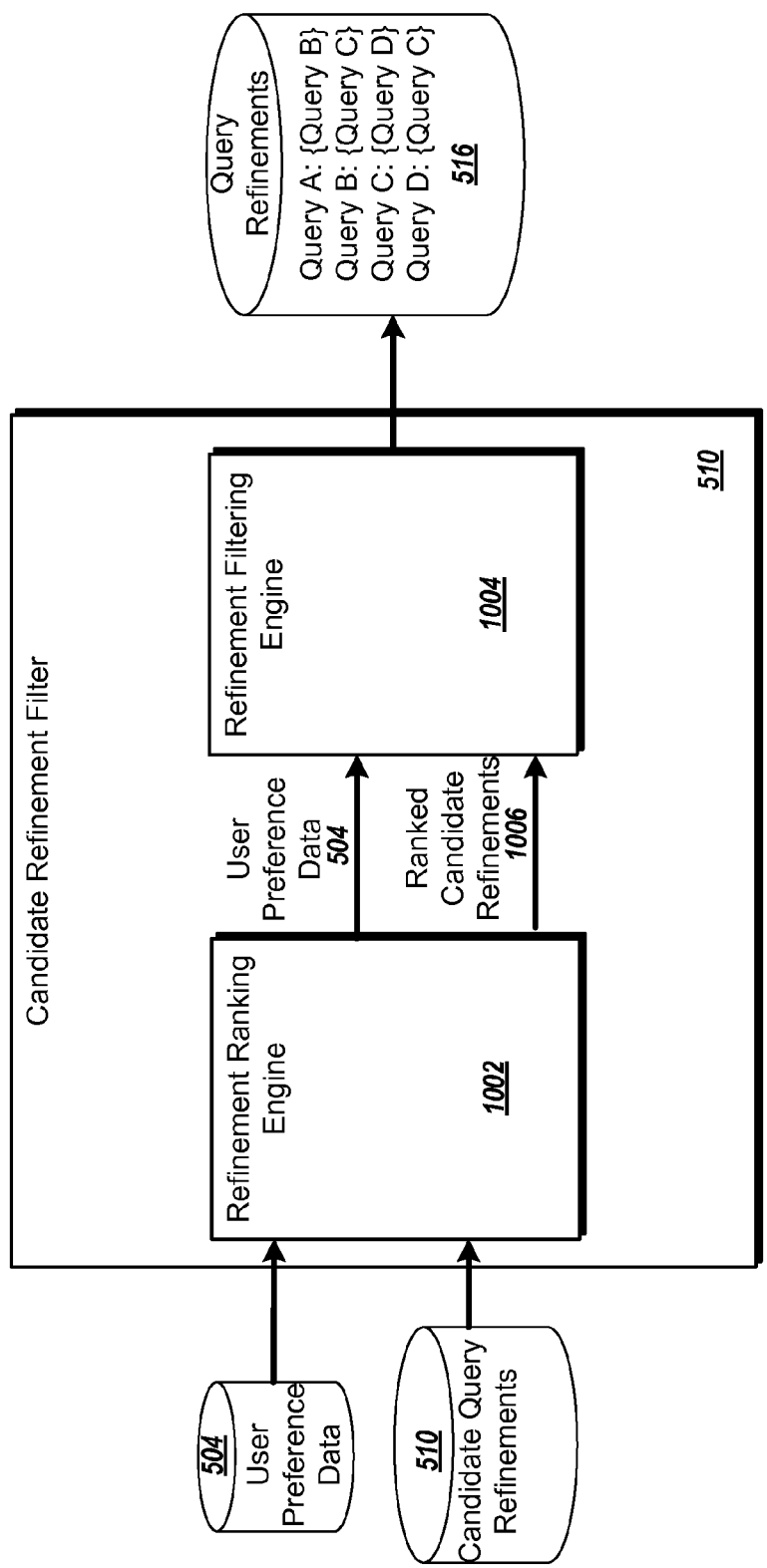
FIG. 10 illustrates a candidate refinement filter that is part of the refinement engine illustrated in FIG. 5.

FIG. 10 illustrates a candidate refinement filter 510 that is part of the refinement engine 260 illustrated in FIG. 5.

The candidate refinement filter 510 includes a refinement ranking engine 1002 and a refinement filtering engine 1004. The boxes shown in FIG. 10 logically represent executing software components or modules. These components can be combined or subdivided in ways other than those shown in FIG. 10 and can be distributed on two or more computing devices.

The refinement ranking engine 1002 receives the candidate query refinements 510 generated by the candidate refinement selector 508, as well as the user preference data 504, and then ranks the refinements for each query using the user preference data, resulting in a ranked group of candidate refinements for each query 1006. The refinement ranking engine 1002 can use various metrics to rank the results, depending, for example, on whether it is desired to have query suggestions that are useful queries in general, or query suggestions that are closely related to the query they are suggestions for. In some implementations, the refinement ranking engine 1002 ranks the candidate query refinements for each query according to the quality scores associated with the query pairs for each query and the candidate refinements for the query (e.g., in order from highest to lowest quality score). In other implementations, the refinement engine 1002 ranks the candidate query refinements for each query according to the quality of result statistics (e.g., click fractions or weighted clicks) for the candidate refinements (e.g., in order from highest to lowest quality of result statistic). In still other implementations, the refinement ranking engine 1002 ranks the candidate refinements for each query according to the click-through-rate for the refinement, that is, the total number of clicks on documents presented in response to the query, divided by the total number of impressions for documents presented in response to the query. In still other implementations, the refinement ranking engine 1002 ranks the candidate refinements according to a weighted click-through-rate for the refinement, for example, where the clicks on each document are weighted by how long the documents were viewed. Other ranking metrics are also possible. For example, in some implementations, the candidate refinements are ranked by a measure of their popularity as queries (e.g., how often do users issue the candidate refinements as queries). In other implementations, compound metrics are used. For example, in some implementations, all query refinements that are superstrings of the query are ranked higher than query refinements that are not superstrings of the query. Within the superstring and not-superstring groups, the refinements are ranked according to one of the other metrics. As another example, in some implementations, the candidate refinements are ranked based on the number of words they have in common with the query refinement. Ties are broken using one of the metrics described above.

The refinement filtering engine 1004 receives the ranked candidate refinements for each query 1006 and processes them in order, to select the best group of query refinements for each query. These query refinements are then associated with the query as confirmed query refinements for the query 516. While only one confirmed refinement for each query is shown in the query refinements 516, multiple refinements can be associated with each query.

The refinement filtering engine 1004 selects the best group of query refinements for a given query as follows. First, the refinement filtering engine 1004 initializes a group of seen documents. In some implementations, the refinement filtering engine 1004 initializes the group of seen documents by selecting a top number of documents responsive to the query (e.g., a top number of the documents responsive to the query, ranked for example, by a quality of result statistic, or all documents responsive to the query having a quality of result statistic satisfying a threshold). In alternative implementations, the refinement filtering engine 1004 selects the top-ranked candidate refinement for the query, identifies the refinement as a confirmed query refinement, and initializes a set of seen documents to be a top number of documents responsive to the confirmed query refinement (e.g., a top number of the documents responsive to the confirmed query refinement, ranked for example, by a quality of result statistic, or all documents responsive to the query having a quality of result statistic satisfying a threshold).

The refinement filtering engine 1004 then processes the candidate refinements (or the rest of the candidate refinements, if the first refinement has already been selected) in order, until a desired number of query refinements have been confirmed, or all candidate refinements have been considered. For each additional query refinement, the refinement filtering engine 1004 calculates an intra-suggestion diversity score between the seen documents (or a subset, such as a top number (e.g., 5) of the seen documents) and documents (or a subset of the documents, such as a top number (e.g., 5)) responsive to the additional query refinement, e.g., much as the diversity filter 706 calculates the diversity score for documents responsive to a first and second query in a query pair. If the intra-suggestion diversity score satisfies a threshold, the refinement filtering engine 1004 associates the additional query refinement with the query as another confirmed query refinement and adds a top number of documents responsive to the additional query refinement to the set of seen documents. If the intra-suggestion diversity score does not satisfy the threshold, the refinement filtering engine 1004 moves on to the next candidate refinement. The threshold can be determined, for example, empirically.

Figure 11:
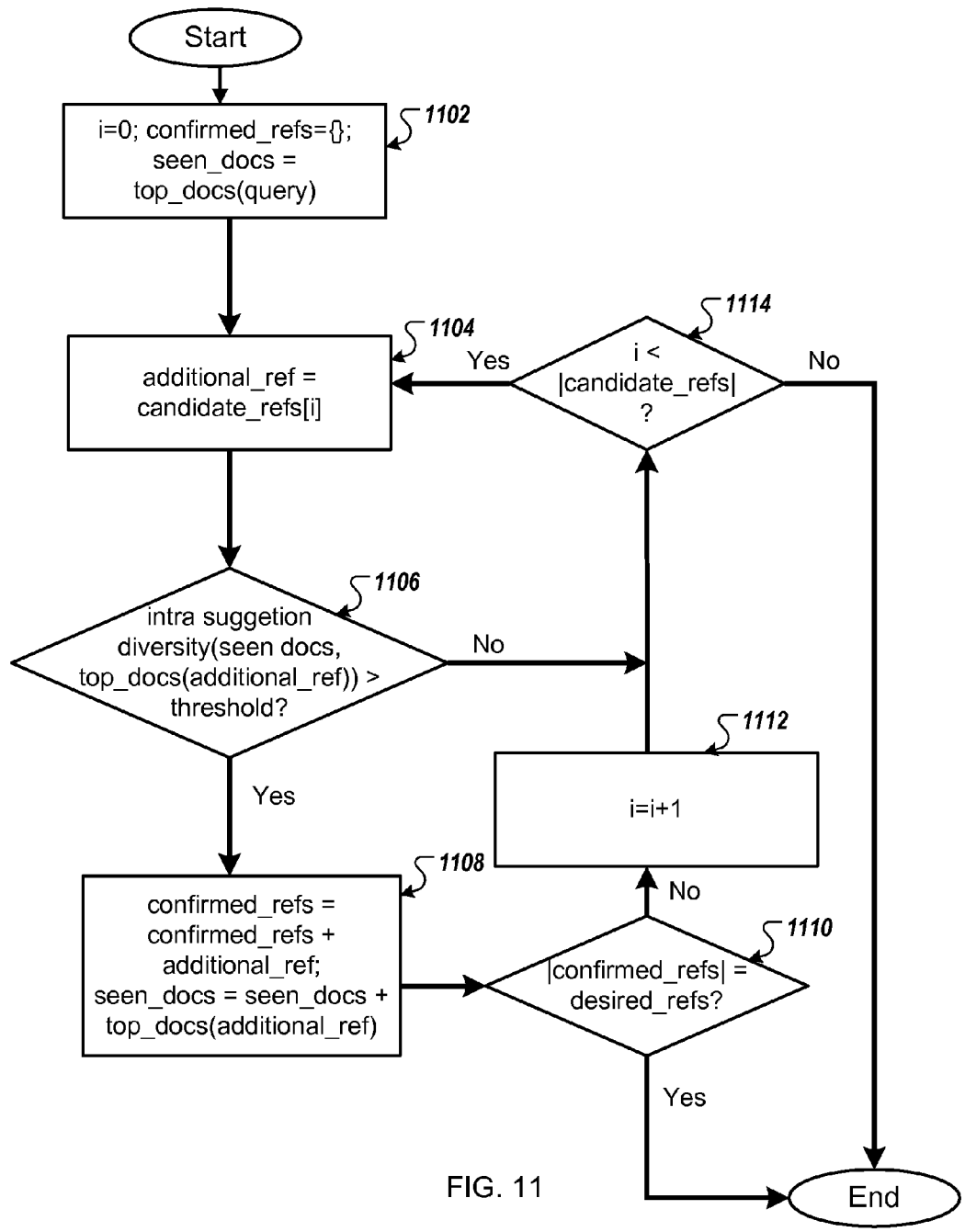
FIG. 11 illustrates an example method for selecting a group of confirmed query refinements for a query from a group of candidate refinements for the query.

FIG. 11 illustrates an example method for selecting a group of confirmed query refinements for a query from a group of candidate refinements for the query. For convenience, the example method 1100 will be described in reference to a system that performs the method 1100. The system can be, for example, the candidate refinement filter 510. In FIG. 11, i is a counter variable that tracks which of the candidate refinements is being processed, confirmed_refs is the set of confirmed refinements that have been selected for the query, seen_docs is the set of top documents responsive to each of the confirmed refinements, additional_ref is the candidate reference that is currently being processed, top_docs is the top documents responsive to a candidate refinement, desired_refs is the desired number of refinements, and query is the query for which the candidate refinements are being identified.

The system begins by setting a counter variable i to 0, setting the group of confirmed refinements to the empty set, and initializing the seen documents to the top documents for the query (step 1102), for example, as described above with reference to FIG. 10. In alternative implementations, the system initializes i to be 1, the confirmed refinements to be the first refinement in the order, and the seen documents to be the top documents for the first refinement in the order, for example, as described above with reference to FIG. 10.

The system then processes the candidate refinements. The system selects the candidate refinement identified by the counter as the additional_ref (step 1104). The system then calculates an intra-suggestion diversity score between a top number of documents responsive to additional_ref and the seen_docs, and compares the intra-suggestion score to a threshold (step 1106), for example, as described above with reference to FIG. 10. If the intra-suggestion diversity score satisfies the threshold (e.g., exceeds the threshold), then additional_ref is added to the group of confirmed_refs, and the top documents for additional_ref are added to the group of seen_docs (step 1108). The system continues to process the additional references by incrementing i (step 1112), until the system determines that a desired number of confirmed refinements have been identified (step 1110) or until all candidate refinements have been processed (step 1114).

Figure 12:
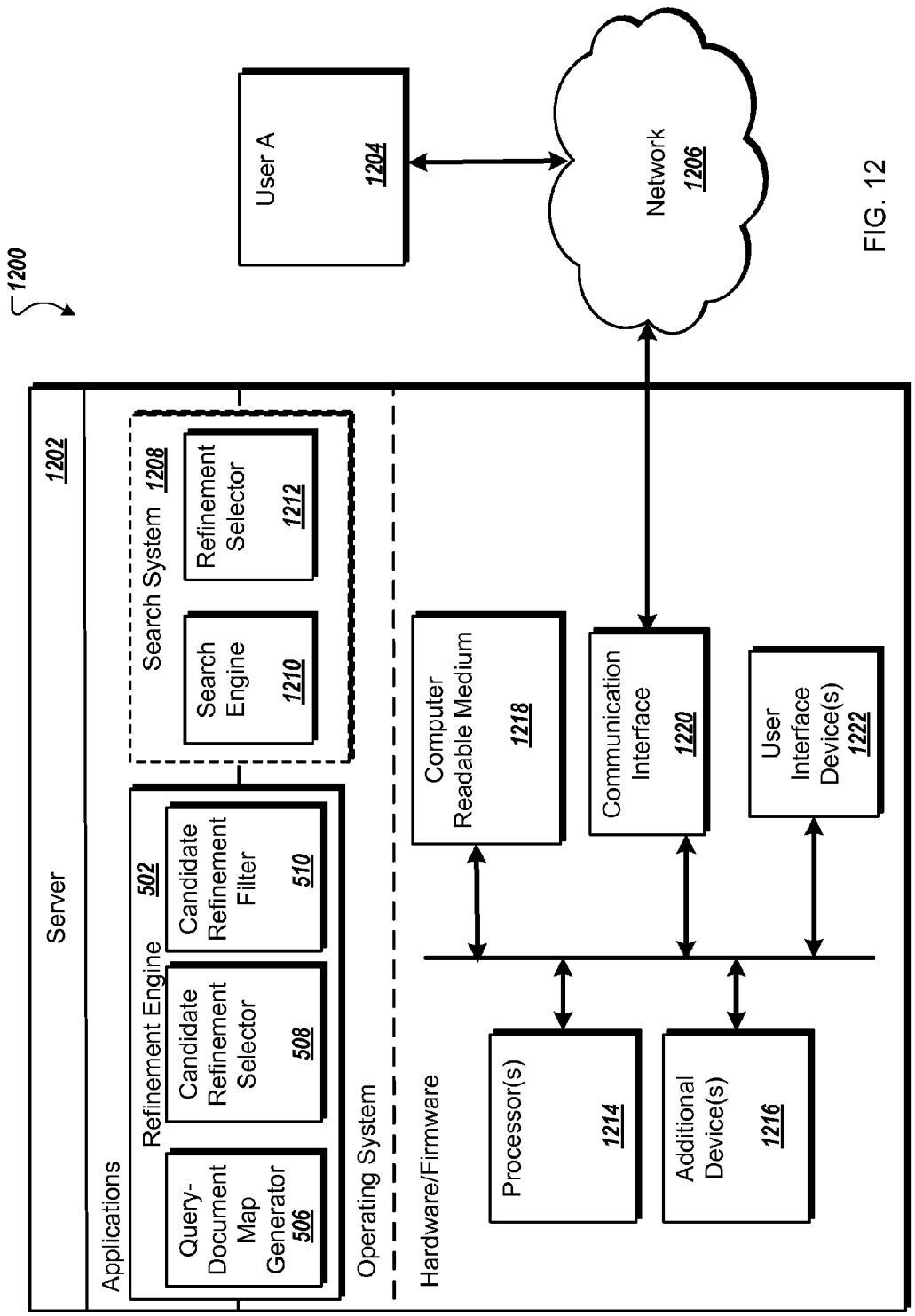
FIG. 12 illustrates an example architecture of a system.

FIG. 12 illustrates an example architecture of a system 1200. The system generally consists of a server 1202 and one or more user computers such as user computer A 1204. The server 1202 and user computers are connected through a network 1206.

The server 1202 consists of one or more data processing apparatus. While only one data processing apparatus is shown in FIG. 12, multiple data processing apparatus can be used. The server includes various modules, e.g. executable software programs, including a refinement engine 260 and a search system 1208. Each module runs as part of the operating system on the server, runs as an application on the server, or runs as part of the operating system and part of an application on the server.

The refinement engine 260 includes a query-document map generator 506, a candidate refinement selector 508, and a candidate refinement filter 510. The query-document map generator 506 generates a document-to-query-to-document map, for example, as described above with reference to FIGS. 5 and 6. The candidate refinement selector 508 obtains query pairs and identifies candidate query refinements for queries from the query pairs, for example, as described above with reference to FIGS. 7 and 9. The candidate refinement filter 510 selects a set of confirmed refinements from the set of candidate refinements for a query, for example, as described above with reference to FIGS. 10 and 11.

The optional search system 1208 includes a search engine 1210, for example, the search engine 230 described above with reference to FIG. 2, and a refinement selector 1212. The search system 1208 uses the search engine 1210 to generate search results responsive to queries, and builds a model of user preference data from user behavior, for example, as described above with reference to FIGS. 2-4. The refinement selector selects confirmed refinements that have been selected for a user-submitted query by the refinement engine 260, and presents them to a user along with search results responsive to the query.

The server 1202 can also have hardware or firmware devices including one or more processors 1214, one or more additional devices 1216, computer readable medium 1218, a communication interface 1220, and one or more user interface devices 1222. Each processor 1214 is capable of processing instructions for execution within the server 1202. In some implementations, the processor 1214 is a single-threaded processor. In other implementations, the processor 1214 is a multi-threaded processor. Each processor 1214 is capable of processing instructions stored on the computer readable medium 1218 or on the storage device 1230. The server 1202 uses its communication interface 1220 to communicate with one or more computers, for example, over a network. Examples of user interface devices 1222 include a display, a camera, a speaker, a microphone, a tactile feedback device, a keyboard, and a mouse.

The server 1202 can store instructions that implement operations associated with the modules described above, for example, on the computer readable medium 1218 or one or more additional devices 1216, for example, one or more of a floppy disk device, a hard disk device, an optical disk device, or a tape device. In some implementations, the data processing apparatus 1202 also stores additional data, for example, user preference data, document-to-query-to-document maps, candidate refinements for queries, confirmed refinements for queries, or other data, on the computer readable medium 1218 or one or more additional devices.

User computers such as user computer A 1204 are connected to the server 1202 through the network 1206. Users submit search queries to the server 1202 and select search results received from the server 1202 using user computers such as user computer A 1204, for example, using a web-browser running on the computer. The server generates user preference data from the actions of the users, for example, by tracking what search queries are submitted by users and what search results responsive to a query are selected by users. This user preference data is used by the refinement engine 260 to generate query refinements for a given query, for example, as described above with reference to FIGS. 5-11. Users can also use user computers such as user computer A 1204 to submit search queries to the server 1202 and to view search results responsive to their queries, as well as query refinements for the queries.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   obtaining a group of query pairs, each query pair including a first query and a second query;
   determining, one or more computers, a quality score for each query pair in the group of query pairs from user preference data for documents responsive to both the first and the second query, wherein the user preference data for documents responsive to both the first and the second query is obtained from user preference data generated based on actions of a group of users, the actions including submitted queries and results responsive to the queries that are selected by respective users;
   determining a diversity score for each query pair in the group of query pairs having a quality score satisfying a quality threshold, the diversity score determined from user preference data for documents responsive to the second, but not the first, query; and
   associating, for each query pair having a quality score satisfying the quality threshold and a diversity score satisfying a diversity threshold, the second query of the query pair with the first query of the query pair as a candidate refinement for the first query.

2. The method of claim 1, further comprising:
   selecting a group of candidate refinements associated with a candidate query, the group of candidate refinements ordered according to an order;
   processing one or more of the candidate refinements according to the order and determining, for at least one additional candidate refinement in the one or more processed candidate refinements, that the additional candidate refinement has an intra-suggestion diversity score satisfying an intra-suggestion diversity threshold, the intra-suggestion diversity score estimating diversity between a first group of top documents responsive to the additional candidate refinement and a group of seen documents;
   associating the additional candidate refinement with the candidate query as a confirmed refinement; and
   adding the first group of top documents to the group of seen documents.

3. The method of claim 2, wherein the group of seen documents comprises one or more top documents responsive to a highly ranked candidate refinement in the group of candidate refinements.

4. The method of claim 3, further comprising associating the highly ranked candidate refinement with the candidate query as a confirmed refinement for the candidate query.

5. The method of claim 2, wherein the intra-suggestion diversity score is determined from quality of result statistics for a first plurality of documents as search results for the additional candidate refinement, wherein the first plurality of documents are not in the group of seen documents.

6. The method of claim 2, wherein the group of candidate refinements are ordered based on quality scores for query pairs corresponding to the candidate query and the candidate refinements.

7. The method of claim 1, wherein the quality score for each query pair is determined from second quality of result statistics for a second plurality of documents as search results for the second query in the query pair, the second plurality of documents being responsive to the first query in the query pair and the second query in the query pair.

8. The method of claim 1, wherein the diversity score for each query pair is determined from third quality of result statistics for a third plurality of documents as search results for the second query in the query pair, wherein the third plurality of documents are responsive to the second query in the query pair, but are not included in a top number of search results responsive to the first query in the query pair.

9. The method of claim 1, wherein the quality threshold has a first value when the second query in a query pair is a query superstring of a first query in the query pair and a different second value when the second query is not a super string of the first query.

10. The method of claim 1, wherein associating the second query of a query pair with the first query of the query pair as a candidate refinement for the first query further comprises:
    determining that the second query of the query pair contains a reference to a first geographic location;
    determining whether the first query contains a reference to a second geographic location; and
    associating the second query with the first query only if the first query contains a reference to the second geographic location.

11. The method of claim 1, wherein obtaining the group of query pairs comprises:
    generating a document-to-query-to-document map from user preference data;

selecting a document from the map, the map relating the document to a group of queries; and generating query pairs from the group of queries.

12. A computer program product encoded on a computer storage medium, operable to cause data processing apparatus to perform operations comprising:

obtaining a group of query pairs, each query pair including a first query and a second query;

determining a quality score for each query pair in the group of query pairs from user preference data for documents responsive to both the first and the second query, wherein the user preference data for documents responsive to both the first and the second query is obtained from user preference data generated based on actions of a group of users, the actions including submitted queries and results responsive to the queries that are selected by respective users;

determining a diversity score for each query pair in the group of query pairs having a quality score satisfying a quality threshold, the diversity score determined from user preference data for documents responsive to the second, but not the first, query; and associating, for each query pair having a quality score satisfying the quality threshold and a diversity score satisfying a diversity threshold, the second query of the query pair with the first query of the query pair as a candidate refinement for the first query.

13. The computer program product of claim 12, further operable to cause data processing apparatus to perform operations comprising:

selecting a group of candidate refinements associated with a candidate query, the group of candidate refinements ordered according to an order;

processing one or more of the candidate refinements according to the order and determining, for at least one additional candidate refinement in the one or more processed candidate refinements, that the additional candidate refinement has an intra-suggestion diversity score satisfying an intra-suggestion diversity threshold, the intra-suggestion diversity score estimating diversity between a first group of top documents responsive to the additional candidate refinement and a group of seen documents;

associating the additional candidate refinement with the candidate query as a confirmed refinement; and adding the first group of top documents to the group of seen documents.

14. The computer program product of claim 13, wherein the group of seen documents comprises one or more top documents responsive to a highly ranked candidate refinement in the group of candidate refinements.

15. The computer program product of claim 14, further comprising associating the highly ranked candidate refinement with the candidate query as a confirmed refinement for the candidate query.

16. The computer program product of claim 13, wherein the intra-suggestion diversity score is determined from quality of result statistics for a first plurality of documents as search results for the additional candidate refinement, wherein the first plurality of documents are not in the group of seen documents.

17. The computer program product of claim 13, wherein the group of candidate refinements are ordered based on quality scores for query pairs corresponding to the candidate query and the candidate refinements.

18. The computer program product of claim 12, wherein the quality score for each query pair is determined from second quality of result statistics for a second plurality of documents as search results for the second query in the query pair, the second plurality of documents being responsive to the first query in the query pair and the second query in the query pair.

19. The computer program product of claim 12, wherein the diversity score for each query pair is determined from third quality of result statistics for a third plurality of documents as search results for the second query in the query pair, wherein the third plurality of documents are responsive to the second query in the query pair, but are not included in a top number of search results responsive to the first query in the query pair.

20. The computer program product of claim 12, wherein the quality threshold has a first value when the second query in a query pair is a query superstring of a first query in the query pair and a different second value when the second query is not a super string of the first query.

21. The computer program product of claim 12, wherein associating the second query of a query pair with the first query of the query pair as a candidate refinement for the first query further comprises:

determining that the second query of the query pair contains a reference to a first geographic location;

determining whether the first query contains a reference to a second geographic location; and associating the second query with the first query only if the first query contains a reference to the second geographic location.

22. The computer program product of claim 12, wherein obtaining the group of query pairs comprises:

generating a document-to-query-to-document map from user preference data;

selecting a document from the map, the map relating the document to a group of queries; and generating query pairs from the group of queries.

23. A system comprising one or more computers programmed to perform operations comprising:

obtaining a group of query pairs, each query pair including a first query and a second query;

determining a quality score for each query pair in the group of query pairs from user preference data for documents responsive to both the first and the second query, wherein the user preference data for documents responsive to both the first and the second query is obtained from user preference data generated based on actions of a group of users, the actions including submitted queries and results responsive to the queries that are selected by respective users;

determining a diversity score for each query pair in the group of query pairs having a quality score satisfying a quality threshold, the diversity score determined from user preference data for documents responsive to the second, but not the first, query; and associating, for each query pair having a quality score satisfying the quality threshold and a diversity score satisfying a diversity threshold, the second query of the query pair with the first query of the query pair as a candidate refinement for the first query.

24. The system of claim 23, further operable to cause data processing apparatus to perform operations comprising:

selecting a group of candidate refinements associated with a candidate query, the group of candidate refinements ordered according to an order;

processing one or more of the candidate refinements according to the order and determining, for at least one additional candidate refinement in the one or more processed candidate refinements, that the additional candidate refinement has an intra-suggestion diversity score satisfying an intra-suggestion diversity threshold, the intra-suggestion diversity score estimating diversity between a first group of top documents responsive to the additional candidate refinement and a group of seen documents;

associating the additional candidate refinement with the candidate query as a confirmed refinement; and adding the first group of top documents to the group of seen documents.

25. The system of claim 24, wherein the group of seen documents comprises one or more top documents responsive to a highly ranked candidate refinement in the group of candidate refinements.

26. The system of claim 25, further comprising associating the highly ranked candidate refinement with the candidate query as a confirmed refinement for the candidate query.

27. The system of claim 24, wherein the intra-suggestion diversity score is determined from quality of result statistics for a first plurality of documents as search results for the additional candidate refinement, wherein the first plurality of documents are not in the group of seen documents.

28. The system of claim 24, wherein the group of candidate refinements are ordered based on quality scores for query pairs corresponding to the candidate query and the candidate refinements.

29. The system of claim 23, wherein the quality score for each query pair is determined from second quality of result statistics for a second plurality of documents as search results for the second query in the query pair, the second plurality of documents being responsive to the first query in the query pair and the second query in the query pair.

30. The system of claim 23, wherein the diversity score for each query pair is determined from third quality of result statistics for a third plurality of documents as search results for the second query in the query pair, wherein the third plurality of documents are responsive to the second query in the query pair, but are not included in a top number of search results responsive to the first query in the query pair.

31. The system of claim 23, wherein the quality threshold has a first value when the second query in a query pair is a query superstring of a first query in the query pair and a different second value when the second query is not a super string of the first query.

32. The system of claim 23, wherein associating the second query of a query pair with the first query of the query pair as a candidate refinement for the first query further comprises:

determining that the second query of the query pair contains a reference to a first geographic location;

determining whether the first query contains a reference to a second geographic location; and associating the second query with the first query only if the first query contains a reference to the second geographic location.

33. The system of claim 23, wherein obtaining the group of query pairs comprises:

generating a document-to-query-to-document map from user preference data;

selecting a document from the map, the map relating the document to a group of queries; and generating query pairs from the group of queries.

* * * * *

UNITED STATES PATENT AND TRADEMARK OFFICE
CERTIFICATE OF CORRECTION

PATENT NO.        : 8,412,727 B1
APPLICATION NO.   : 12/794069
DATED             : April 2, 2013
INVENTOR(S)       : Abhinandan S. Das et al.

It is certified that error appears in the above-identified patent and that said Letters Patent is hereby corrected as shown below:

In the Claims

Column 21, Line 49 at claim 1; replace:
 "determining, one or more computers, a quality score for" with
 -- determining, using one or more computers, a quality score for --

Signed and Sealed this
Second Day of July, 2013

Teresa Stanek Rea
*Acting Director of the United States Patent and Trademark Office*